O. J. W. HIGBEE.
VACUUM WALL RECEPTACLE.
APPLICATION FILED SEPT. 22, 1911.
1,033,320.
Patented July 23, 1912.
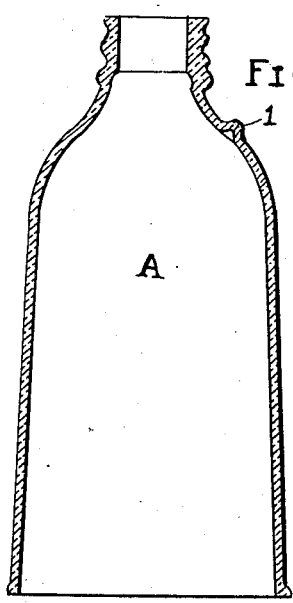
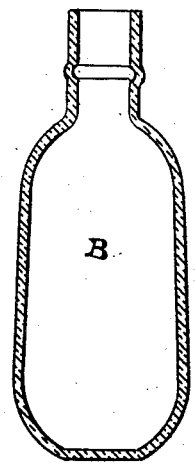
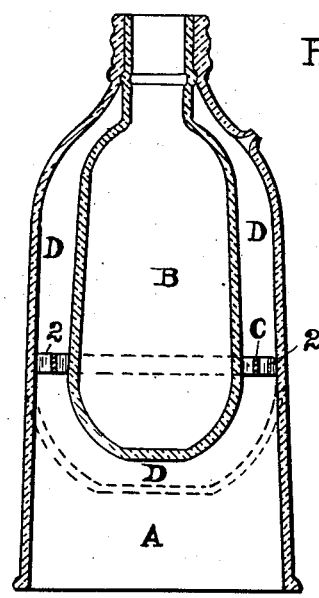
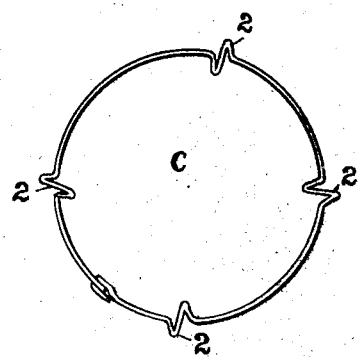

UNITED STATES PATENT OFFICE.

ORLANDO J. W. HIGBEE, OF PITTSBURGH, PENNSYLVANIA.

VACUUM WALL-RECEPTACLE.

1,033,320.  Specification of Letters Patent. Patented July 23, 1912.

Application filed September 22, 1911. Serial No. 650,698.

*To all whom it may concern:*

Be it known that I, ORLANDO J. W. HIGBEE, a citizen of the United States, and residing in the city of Pittsburgh, in the county of Allegheny and State of Pennsylvania, have invented or discovered new and useful Improvements in Vacuum Wall-Receptacles, of which the following is a specification.

My invention consists in a new and improved vacuum wall bottle or other receptacle intended to preserve the temperature of the contents of said receptacle. The material from which such receptacles are made is glass inasmuch as a vacuum cannot be successfully maintained within metal walls. Such receptacles have hitherto been very fragile and of short life as the inner wall of the vacuum chamber is exposed to extreme temperatures and rapid changes therein upon the introduction of the contents into the receptacle, and the outer wall is exposed to the blows, jars and other shocks incident to usage. To protect the outer wall of the vacuum chamber from fracture, it has been heretofore customary to inclose the same in a cushioning casing or box which occupies more space and increases the cost of manufacture. It also interferes with keeping the receptacle in a sanitary condition as immersion in boiling water destroys the casing or box.

My improved receptacle requires no outer casing or box, but is able of itself to resist successfully the extremes and rapid changes of temperature and the blows, jars and other shocks of usage. I form the inner wall of the vacuum chamber, which wall is exposed to the temperature of the contents of the receptacle, of blown glass, as best suited for that purpose, while the outer wall of the vacuum chamber, which wall is exposed to the blows, jars and other shocks of usage, is formed of pressed glass, as best suited for that purpose.

The receptacle is formed of a blown glass blank suspended by its neck within a pressed glass blank, a vacuum chamber being contained between said blanks. To prevent vibration of the inner blank I interpose within said vacuum chamber between the walls of the two blanks a resilient cushioning ring provided with inward- and outward-projecting bends or curved portions alternately engaging the wall of either blank, thus also cushioning the inner blank against shocks exerted on the wall of the outer blank.

In the accompanying drawings, Figure 1 is a vertical section of the outer blank; Fig. 2 is a similar view of the inner blank; Fig. 3 is a similar view of the two blanks assembled and fused or welded together at their necks, and Fig. 4 is an enlarged plan view of the cushioning member which is interposed between the blanks when the same are assembled.

The following is a detailed description of the drawings. I form the outer blank A by pressing the same in an inverted position with an open bottom, as shown in Fig. 1. 1 is a hollow projection formed in the pressing operation on the shoulder of the blank A, which projection is afterward broken through, as shown in Fig. 3. The inner blank B is blown with a closed bottom. The blank B is inserted in the blank A, with their necks telescoping together, as shown in Fig. 3. The necks are then reheated and fused or welded together by means of a suitable tool, not shown. Before inserting the blank B in the blank A I mount on said blank B a cushioning ring or band C of resilient material, such as metal, provided with a plurality of inward- and outward-projecting bends or curves 2—2 which, extending transversely the width of said ring or band, space the body of the ring away from the blank B and impinge alternately against the wall of either blank when the blanks are assembled, as shown in Fig. 3. I prefer to form the bodies of blanks A and B with an upward taper so that the ring C is held in place when the blanks are assembled. The bottom of the blank A is then reheated and cut-in or inclosed, as shown dotted lines in Fig. 3, this forming a chamber D between the blanks A and B. The tube of a vacuum pump is then attached to the projection 1 and a vacuum established in the chamber D, which vacuum is established by sealing off said projection 1.

It is evident from the above that my receptacle is able to resist all the destructive forces which are exerted upon it.

The inner blown wall of the vacuum chamber is not liable to fracture from the excessive heat or cold of the contents of the receptacle or the sudden changes of temperature incident upon introducing such contents, nor will the substantial pressed glass of the outer wall of the receptacle be destroyed by the blows, jars or other shocks of usage. If the inner wall were of pressed glass, it would be quickly cracked and destroyed by the extreme heat or cold of the contents of the receptacle and the sudden changes in temperature, and, likewise, if the outer wall were of blown glass, it would be easily fractured by usage, even if inclosed in a protective casing or box which is safely dispensed with in the case of my invention. The cushioning ring C prevents vibration of the inner blank which would tend to fracture the same at its point of attachment to the outer blank and also cushions the inner blank against the injurious result of shocks exerted on the outer blank by assuming through its resiliency such shocks.

What I desire to claim is—

1. In a double-walled receptacle, a resilient cushioning-device interposed between said walls and having inward- and outward-projecting loops formed by bending the material of said cushioning-device transversely, said loops engaging the walls of said receptacle for mutually supporting the same.

2. A resilient cushioning-device for use in double-walled receptacles, etc., having inward- and outward-projecting loops formed by bending the material of said cushioning-device transversely.

Signed at Pittsburgh, Penna., this 20th day of September 1911.

ORLANDO J. W. HIGBEE.

Witnesses:
EDWARD A. LAURENCE,
T. CHALMERS DUFF.